INVENTOR
DONALD G. WELLS

BY Clifford B. Price
ATTORNEY

United States Patent Office 3,509,852
Patented May 5, 1970

3,509,852
GLASS CONTAINER COATING MACHINE
Donald G. Wells, Lancaster, Pa., assignor to Armstrong Cork Company, Lancaster, Pa., a corporation of Pennsylvania
Filed Nov. 24, 1967, Ser. No. 685,619
Int. Cl. B05c 5/00
U.S. Cl. 118—323                                    2 Claims

ABSTRACT OF THE DISCLOSURE

Apparatus for the coating of glass containers. The glass containers are carried by a conveyer system past the glass coating apparatus. A plurality of spray nozzles span the width of the conveyer and move at a speed substantially greater than the speed of the conveyer. The nozzles have a primary movement in a direction along with the conveyer movement during which time the spray heads pass between adjacent bottles. The spray heads may just retrace their path or index laterally one bottle spacing distance and reverse their path of travel placing a coating on the next two adjacent sets of bottles. The spray heads would then index laterally back to their original path and repeat their cycle of operation. Consequently, the plurality of spray heads move between adjacent bottles and the spray heads carry out their coating operations only when moving in the same or reversed direction from the direction of bottle movement.

BACKGROUND OF THE INVENTION

Field of the invention

The invention involves an apparatus for providing a spray coating to glassware. More particularly, the apparatus provides the coating to glassware that is continuously supplied and advanced past the spraying apparatus.

DESCRIPTION OF THE PRIOR ART

Prior art apparatus for providing of a spray coating to glassware are shown in U.S. Pat. Nos. 2,925,801, 2,926,101, and 3,195,501. The coating machines of Pat. Nos. 2,925,801 and 2,926,101 are used primarily with an intermittent glassware conveyer operation or may be used with a continuous conveyer operation, but only when the conveyer moves at a very slow speed. The apparatus of Pat. No. 3,195,501 is meant to be used with a relatively rapid moving glassware conveyer which is capable of continuous movement. The single spray head is mounted for angular movement relative to the conveyer to compensate for the longitudinal movement of the bottles as the spray head passes across the conveyer. (See FIG. 2.)

The intermittent movement of the glassware conveyer permits rather accurate positioning of the spray nozzle relative to the glassware so that the coating is applied only on the barrel of the glassware and not on the sealing surface at the upper portion of the glassware or inside of the glassware. However, intermittent operation does undesirably affect the speed of operation. Continuous operation with the single head sprayer has been accomplished, but it has certain limitations. The glassware is on the conveyer in parallel rows which are perpendicular to the longitudinal edge of the conveyer structure. To provide a proper coating on the glassware, the spray head should at all times stay midway between two adjacent rows of glassware. Since the glassware is moving at the same time that the spray head is moving, the spray head cannot travel a path perpendicular to the longitudinal edge of the conveyer and still maintain its position midway between two adjacent rows of containers. Consequently, the path of the spray head must be at an angle relative to the longitudinal edge of the conveyer so that the spray head moving as the glassware moves will constantly stay midway between two adjacent rows of glassware. Such a structure will permit only one pass of the spray assembly relative to the glassware and, consequently, place only a single coating on the glassware.

The need for keeping the spray assembly at a midpoint between two adjacent pieces of glassware to eliminate an improper spray on one piece of glassware and an insufficient spray on another piece of glassware is one problem of operating the prior art machines. The ability to place more than one coating is also a limitation of the prior art machines. It is these above limitations and problems that have been solved by the coating apparatus of this invention.

SUMMARY OF THE INVENTION

The invention is directed towards a glass coating apparatus for placing plural coats on the glassware. The glassware is carried by a conventional conveyer structure so that the glassware moves towards, through, and out of the coating apparatus. The apparatus involves the use of a plurality of spraying nozzles carried by a support structure which spans the transverse width of the conveyer structure. The nozzles are positioned between alternate rows of the glassware as it passes through the coating apparatus. The spray coating nozzles move initially in the same direction as the conveyer structure, passing a plurality of bottles and providing a spray coating on slightly more than half of the circumferential area of two adjacent bottles. At the end of their movement in the initial direction, the nozzles index and move laterally of the conveyer system to the next adjacent row of bottles. The spray nozzles then return down this row in the opposite direction from conveyer travel to coat the remaining portions of two adjacent bottles. The spray heads then index back to their original row of travel.

The path of travel of the spray nozzles is substantially in a rectangular path, moving back and forth along two adjacent rows. The spray nozzles move at a speed substantially greater than the speed of the conveyer. Consequently, the spray nozzles may make several trips along their rectangular path before a particular bottle has moved a distance comparable to the total forward or total reverse distance that the spray nozzle move. Depending upon the speed that the spray nozzles move relative to the conveyer speed, it is possible to place from one to twelve coatings on an individual bottle. Since the spray nozzle, during its spraying operation, is moving in the direction of conveyer travel, it always must be accurately positioned midway between two adjacent bottles since there is no relative movement of the nozzle to the bottles except in the direction in which the bottles are moving.

DESCRIPTION OF THE PREFERRED EMBODIMENT

Figure 1:
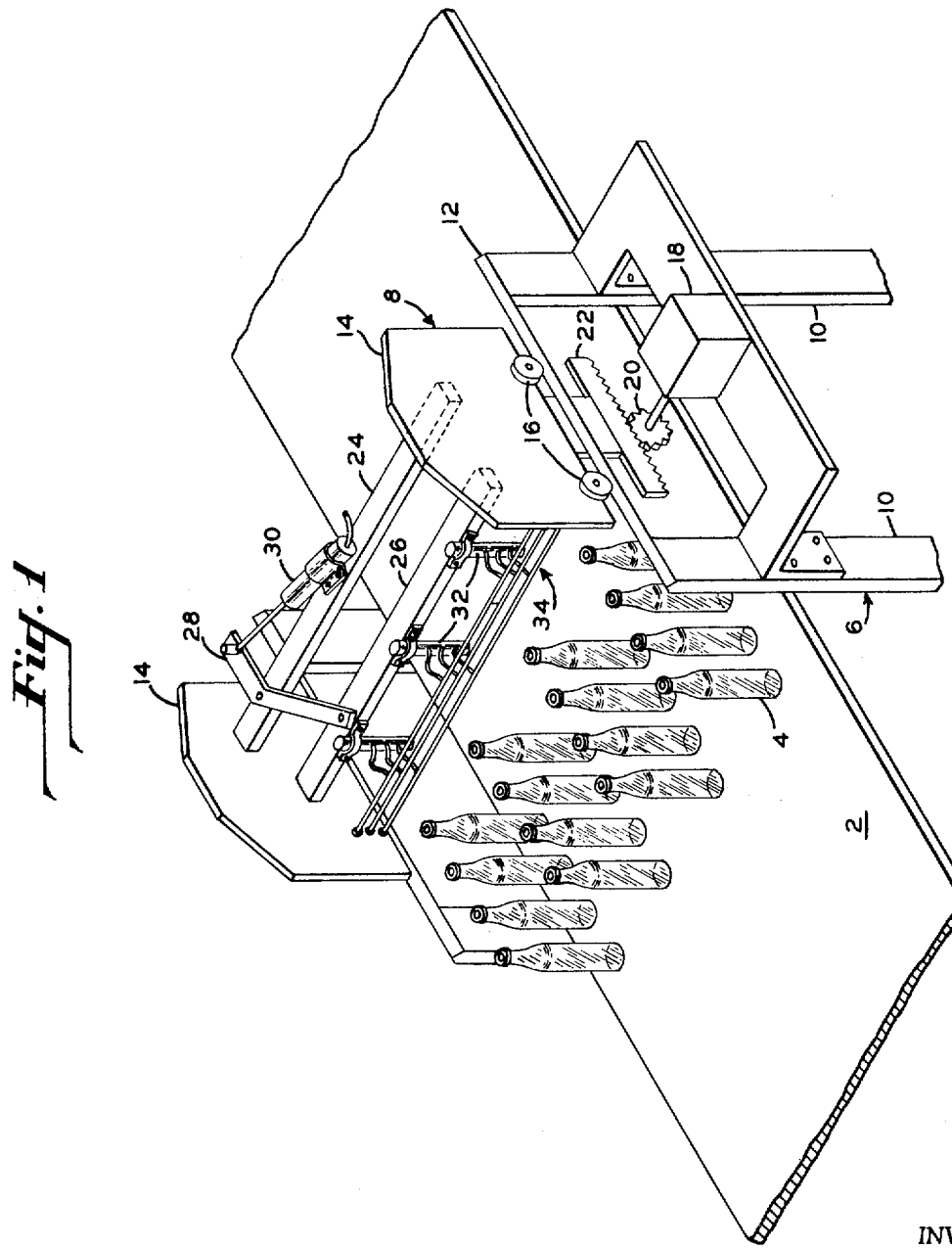
FIG. 1 is a fragmentary perspective view of the spray apparatus for carrying out this invention.

The coating apparatus is shown in the perspective view of FIG. 1. A conveyer structure 2 delivers the glassware 4 to the spraying apparatus and removes the glassware from the spraying apparatus.

The spraying apparatus consists of a support structure 6 and a carriage structure 8. The support structure consists of support posts 10 which carry trackways 12. The trackways are positioned adjacent the edges of the conveyer belt and extend parallel with the longitudinal edge of the conveyer belt. The carriage assembly moves back and forth along the trackways 12.

The carriage assembly 8 utilizes end supports 14 which carry the spraying structure therebetween. The end supports 14 have fastened thereto wheels 16 which are guided along the trackway 12. Consequently, the wheels 16 cause the carriage to reciprocate forward and backward in the general direction of conveyer movement.

A variable speed, reversible drive means 18 drives a gear 20 which in turn causes reciprocating movement of a rack 22. The rack 22 is integrally fastened to the carriage assembly 8 and, consequently, provides the carriage assembly with its forward and backward movement. A support bar 24 spans the space between the two end supports 14. A second slightly shorter bar 26 is positioned between the end supports 14. A bell crank 28 is pivoted on support bar 24 and has one end of the crank fastened to bar 26. A fluid piston 30 is connected to the other end of the bell crank and causes reciprocating movement of the bell crank. This reciprocating movement of the bell crank in turn causes reciprocating movement of the support bar 26 in a direction transverse to the conveyer direction of travel.

On the support bar 26 are fastened a plurality of spray nozzle assemblies 32 which are used to distribute the spray coating to the underlying bottles. An appropriate distributor system 34 provides one fluid and two air supply lines to each spray nozzle assembly 32.

Figure 3:
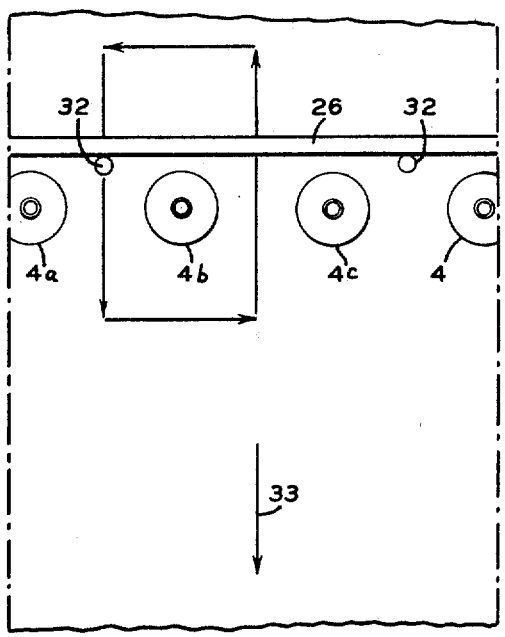
FIG. 3 is a fragmentary top view showing the path along which the spray nozzles move.

Referring to FIG. 3, there is shown a partial top view of the spray coating apparatus. Support bar 26 carries the spray nozzle assemblies 32 in an overlying position relative to the glass bottles 4. The spray nozzle assemblies 32 are spaced between alternate rows of bottles. As seen by the arrows in FIG. 3, an individual spray nozzle moves first along a path in the direction of conveyer travel (arrow 33). At the end of its forward movement, it then shifts laterally to the next adjacent space between two bottles. The spray nozzle then moves in the reverse direction to conveyer travel to the end of its movement where it then indexes laterally back into its original path. During its forward movement, the spray nozzle assembly will coat substantially more than half of the bottles 4a and 4b, coating these bottles on their adjacent surfaces. When the spray nozzle assembly 32 moves in its reverse direction, ot coats over half of bottles 4b and 4c. Therefore, it will be seen that bottle 4b has been completely coated once by the complete cycle of aspray nozzle assembly. At the same time, the spray nozzle assembly has coated over half of bottle 4a and bottle 4c. Adjacent spray nozzle assemblies 32 then will provide the other half coatings on bottles 4a and 4c. Naturally, this particular arrangement will always require the use of one fixed nozzle assembly to take care of the outer side of the last bottle on the lefthand side of the conveyer structure. It is possible to use as many spray nozzles as there are rows and just have the nozzles move in a straight-line reciprocation. Furthermore, the spray nozzles can be driven at a faster forward directional speed than reverse directional speed to maintain a constant relative velocity to the moving bottles.

The reciprocating movement of the carriage assembly 8 is readily controlled by limit switches at the end of the carriage movement, which will simply reverse the drive of the variable speed, reversible drive means 18. This same means 18, since it is of variable speed, may be used to adjust the speed of movement of the carriage assembly 8 and thereby alter the number of coats applied to the bottles being carried on the conveyer 2. Similarly, movement of the support bar 26 will be controlled by conventional limit switch structures which are actuated at the end of the carriage movement and cause indexing laterally of the support bar in the appropriate direction transversely of the conveyer assembly. While it is not necessary, it is convenient also to control the fluid supply means so that during the transverse movement of the spray assemblies relative to the conveyer the spray coating is shut off.

Figure 2:
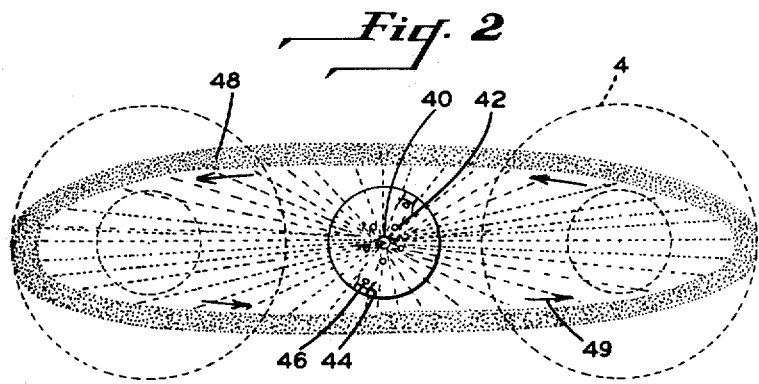
FIG. 2 is the view of a nozzle structure and the spray nozzle pattern relative to two adjacent bottles.

FIG. 2 discloses the spray structure which provides a novel spray pattern. This particular spray pattern is advantageously used with this particular spraying apparatus to provide a relatively uniform and complete coating on the bottles during each pass. A fluid port 40 is used to dispense the coating fluid. Air ports 42 surrounding the fluid port 40 are used to atomize the fluid, and these ports alone would cause the fluid to be dispensed in a conical pattern with the apex of the cone being positioned by the fluid port 40. Slightly raised above the plane of the fluid port 40 and air ports 42 are two posts 44. A center line passing through the two posts is displaced slightly from a center line passing through the nozzle assembly, which center line through the nozzle assembly would be parallel to the direction of conveyer movement. In the posts 44 are located air ports 46. The presence of the air ports 46 tend to compress the two opposite surfaces of the conical pattern and thus form an elliptic-conical pattern of atomized particles rotating about the major axis of the elliptical pattern, as shown as element 48 of FIG. 2 with the arrows 49 showing the direction of rotation. Element 48 would in effect be a cross-sectional view through the spray pattern with the conical axis being perpendicular to the plane of the cross-sectional view. From FIG. 2 it will readily be seen that this particular pattern will provide a coating of over one-half of the glassware barrel adjacent to the nozzle assembly (dash lines indicate relative size and positions of bottles).

By having the nozzle assembly move through its generally rectangular path with a speed substantially greater than the conveyer speed, it is possible to provide anywhere from one to twelve coatings on a particular bottle as it passes through the range of forward and reverse travel for the carriage assembly. Due to the ability to provide a plurality of coatings, it is thus possible to build up a single composite coating composed of a plurality of layers, the single composite coating being of a predetermined thickness. Since the spray nozzle, during its normal spraying cycle, is traveling parallel with the direction of bottle travel, the spray nozzle assembly can readily be maintained in an area midway between two adjacent bottles and, therefore, never pass over the top of a bottle or near the bearing surface of the top of the bottle and thus undesirably coat these areas.

While the invention has been described with particular reference to certain preferred embodiments thereof, it is possible to make variations and modifications therein without departing from the spirit and scope of the invention as defined in the appendant claims.

I claim:

1. In combination, a conveyer means moving articles with their open end up, said conveying means carrying and holding the articles in a plurality of parallel rows with the articles lined up in parallel rows both along and across the direction of travel of the conveying means, said conveying means moving continuously, spraying apparatus for coating the articles on the conveying means, said spraying apparatus comprising at least one spraying means for dispensing the coating material to be placed on the articles arranged on the conveying means, said spraying means being positioned above the conveying means and being positioned between two parallel rows of articles which are parallel in the direction of travel of the conveyer, means moving the spraying means while the conveying means is moving, first in a direction parallel to the rows of articles and in the direction the articles are moving so as to coat the outside of the articles without getting coating material in the open ends of the articles, then returning the spraying means to its original starting point, said spraying means being shifted from between two adjacent rows to the next adjacent area between the rows of articles just prior to the time it returns to its original starting point so that the spraying means moves through a rectangular pathway which has its longest side parallel to the direction of travel of the conveyer, the spraying means moves through this rectangular pathway at the same time the articles are continuously carried and held by the conveying means, the spraying means is mounted on a carriage which reciprocates across the conveyer means, and the aforesaid carriage is mounted on a second carriage which reciprocates in a direction with and opposite to the direction of movement of the articles.

2. The combination of claim 1 wherein means are provided to move the spraying means through its reciprocating pathway at a variable speed so that the spraying means may apply one or more coatings to the articles.

References Cited

UNITED STATES PATENTS

| | | | |
|---|---|---|---|
| 2,139,133 | 12/1938 | Paasche | 239—298 |
| 2,152,046 | 3/1939 | Gustafsson et al. | 239—298 |
| 2,736,671 | 2/1956 | Ransburg et al. | 118—323 X |
| 2,898,881 | 8/1959 | Straley | 118—323 X |
| 2,925,801 | 2/1960 | Bivens et al. | 118—323 X |
| 2,263,011 | 11/1941 | Roselund | 118—323 X |
| 2,281,169 | 4/1942 | Pattison | 118—323 X |
| 2,331,164 | 10/1943 | Berger et al. | 134—129 X |
| 3,312,562 | 4/1967 | Miller | 118—323 X |

JOHN P. McINTOSH, Primary Examiner

U.S. Cl. X.R.

118—324